(12) United States Patent
Oka et al.

(10) Patent No.: US 6,320,341 B1  
(45) Date of Patent: Nov. 20, 2001

(54) CONTROL DEVICE FOR MOVABLE MEMBER

(75) Inventors: Toshimitsu Oka; Kohji Aoki; Hideyuki Kanie; Hitoshi Ishikawa, all of Aichi-ken (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 09/429,922

(22) Filed: Oct. 29, 1999

(30) Foreign Application Priority Data

Oct. 29, 1998 (JP) ................................. 10-308391

(51) Int. Cl.[7] ............................ G05B 5/00; G05B 19/28
(52) U.S. Cl. ...................... 318/466; 318/603; 318/467; 318/468
(58) Field of Search ................................ 318/560–696, 318/139, 440, 469, 103; 364/424.02, 424.04, 424.06, 424.05, 483; 290/38 R; 180/287; 379/12; 296/65.1; 388/803, 804

(56) References Cited

U.S. PATENT DOCUMENTS

| | | | |
|---|---|---|---|
| 3,668,657 | * | 6/1972 | Deloach .......................... 340/173 R |
| 3,774,115 | * | 11/1973 | Greiner ................................ 328/36 |
| 4,434,468 | * | 2/1984 | Caddick et al. .................. 364/424 |
| 4,463,426 | * | 7/1984 | Caddick et al. .................. 364/424 |
| 4,510,426 | | 4/1985 | Michaels et al. . |
| 4,608,637 | * | 8/1986 | Okuyama et al. .................. 364/424 |
| 4,689,537 | * | 8/1987 | Mizuta et al. ...................... 318/568 |
| 4,706,194 | * | 11/1987 | Webbe et al. .......................... 364/424 |
| 4,947,051 | * | 8/1990 | Yamamoto et al. ............... 290/38 R |
| 4,997,053 | * | 3/1991 | Drori et al. ............................ 180/287 |
| 5,179,328 | * | 1/1993 | Furuse et al. ........................ 318/603 |
| 5,187,665 | * | 2/1993 | Futami et al. .................... 364/424.05 |
| 5,192,873 | * | 3/1993 | Wrenbeck et al. ..................... 307/38 |
| 5,455,884 | * | 10/1995 | Yang ..................................... 388/803 |
| 5,497,326 | * | 3/1996 | Berland et al. ................. 364/424.05 |
| 5,903,122 | | 5/1999 | Mesnage et al. . |
| 6,064,165 | * | 5/2000 | Boisvert et al. ..................... 318/465 |

FOREIGN PATENT DOCUMENTS

| | | |
|---|---|---|
| 197 06 297 A1 | 8/1997 | (DE) . |
| 0 082 664 A2 | 6/1983 | (EP) . |
| 0 697 305 A1 | 2/1996 | (EP) . |
| 0997341 * | 3/2000 | (EP) . |
| 2 060 944 A | 5/1981 | (GB) . |
| 2 205 185 A | 11/1988 | (GB) . |
| 10 023787 | 1/1998 | (JP) . |

OTHER PUBLICATIONS

"New Car Features on Toyota Crown Majesta" pp. 5–64 and 5–65, Oct. 1991.

* cited by examiner

Primary Examiner—Paul Ip  
(74) Attorney, Agent, or Firm—Sughrue, Mion, Zinn, Macpeak & Seas, PLLC

(57) ABSTRACT

A control device for a movable member includes a DC motor for establishing position transfer of the movable member in such a manner that after a first position of the movable member is stored in a memory, even if the movable member is at a second position, the moving member is returned to the first position only upon manipulating a switch and a motor pulse generating circuit generates a cut-off frequency which is variable depending on a ripple pulse frequency which is indicative of a rotational number of the motor.

7 Claims, 13 Drawing Sheets

(a) switched cupacitance circuit (b)

$$f_c = \frac{1}{2\pi RC_1}$$

$$f_c = \frac{1}{2\pi \cdot \frac{1}{fC_2} \cdot C_3} = \frac{fC_2}{2\pi C_3}$$

cutoff frequency

(a)

(b)

CONTROL DEVICE FOR MOVABLE MEMBER

BACKGROUND OF THE INVENTION

1. Field of the Invention

The present invention is directed to a control device associated with a movable member and which operates in such a manner that a specific position of the movable member such as a vehicular seat is memorized in a memory and even though the movable member is transferred to another position, the movable member can be returned to the specific position by means of an easy or simple switch operation.

2. Prior Art

In recent years, in vehicles, for establishing a suitable attitude of an occupant when he/she sits on a seat device, the seat device is configured so that its portions are transferred to specific positions depending on his/her outer profile and the set positions are fed, as signals, to a memory of a controller. When another occupant person sits on the seat device, sometimes the portions of the seat may be transferred to other positions for his/her own best attitude. Thereafter, if the occupant wants to sit on the seat device, when the occupant pushes a button of the controller, on the basis of the memorized set position signals, the controller moves the portions of the seat device to the respective set positions. Such a seat device, which is called a 'memory seat', is developed for relieving seat related adjusting efforts of the occupant when he/she gets in and/or out the vehicle.

As is well known, the seat device includes a seat-cushion, a seat-back hinged to a rear portion of the seat-cushion, and a head-rest mounted telescopically to a top portion of the seat-back. The seat device also includes a sliding motor, a reclining motor, a front-vertical motor, a rear-vertical motor, and a head-rest motor for moving the whole seat device in the vehicle-longitudinal direction, bringing the seat-back into a desired or reclined angular position, moving a front portion of the seat-cushion in the vertical direction, moving a rear portion of the seat-cushion in the vertical direction, and establishing telescopic movements of the head-rest relative to the seat-back, respectively. These motors are under the control of the controller. After the occupant brings these members to his/her favorite or suitable positions, the resultant positions are memorized. Even though position change is made relating to at least one of the seat-cushion per se, the front portion of the seat-cushion, the rear-portion of the seat-cushion, the seat-back, and the head-rest, when a restoration switch or button is turned on, the controller returns the member from another position to the set or memorized position by driving the corresponding motor.

In the foregoing structure, the current position of each member or portion is determined by a rotational condition of the corresponding motor, which requires a position sensor and related parts for each motor. In detail, for example, 'NEW CAR FEATURES ON TOYOTA CROWN MAJESTA' issued on September, 1991 indicates, on its pages 5-64 and 5-65, that a shaft of the motor is provided with a magnet, a rotational condition of the magnet is detected by a hole element opposed to the magnet, and the resultant output from the hole element or the motor rotational signal is fed to the controller by way of a harness.

However, in the foregoing structure, each motor has to be provided therewith its own magnet, hole element, and wire harness, with the result that the sole seat device has to include a considerable number of parts. Providing such parts for the motor is very cumbersome and the surrounding area of the motor becomes very complex. In addition, since such an arrangement has to be provided for each of the other seats, the foregoing drawbacks are multiplied.

SUMMARY OF THE INVENTION

It is, therefore, a principal object of the present invention to provide a control device for a moving member without the foregoing drawbacks.

In order to attain the foregoing object, the present invention provides a control device for a movable member which comprises a dc motor for establishing position transfer of the movable member in such a manner that after a first position of the movable member is stored in a memory, even if the movable member is at a second position, the moving member is returned to the first position only upon manipulating a switch; and a motor pulse generating circuit generates a cut-off frequency which is variable depending on a ripple pulse frequency which is indicative of a rotational number of the motor.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which;

FIG. 1 includes a perspective view of a vehicle seat showing directions of movement and location of actuators;

DETAILED DESCRIPTION OF THE PRESENT INVENTION

Preferred embodiments of the present invention will be described hereinafter in detail with reference to the accompanying drawings.

Figure 1:
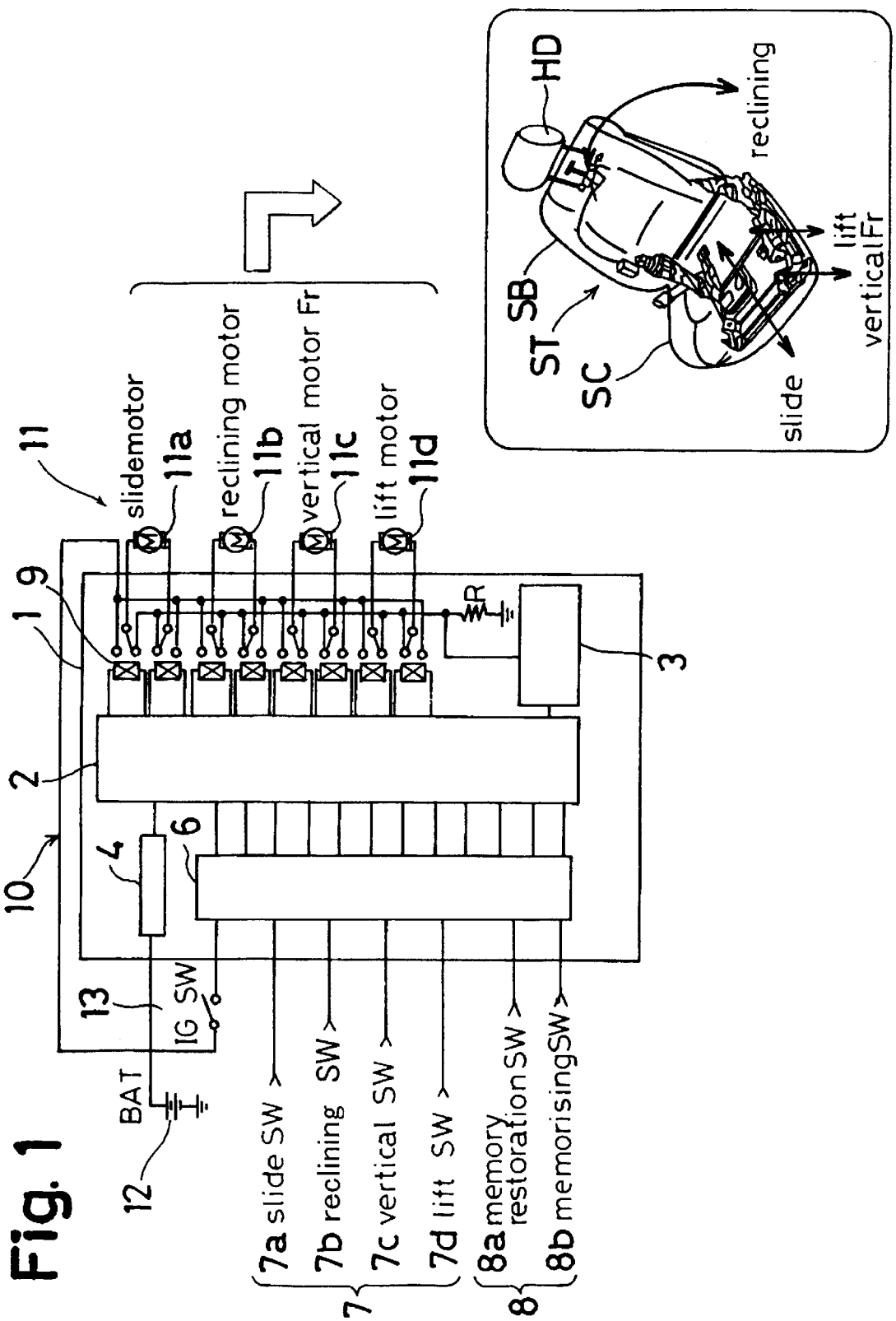
FIG. 1 is a schematic diagram of an embodiment of a control device for a movable member in accordance with the present invention.

First of all, with reference to FIG. 1, there is illustrated a memory seat device 10 to which is applied a control device for a movable member in accordance with an embodiment of the present invention. The memory seat device 10 includes a controller 1 to which is connected to a power source 12 which is in the form of a battery having a positive terminal and a negative terminal. The negative terminal of the battery 12 is grounded, while the positive terminal of the battery 12 is connected to a central processing unit or CPU 2 by way of an ignition switch 13 and an input interface circuit 6. Thus, when the ignition switch 13 is turned on, an electric voltage of 12 volts is applied to the CPU 2. In addition, the plus terminal of the battery 12 is connected to the CPU 2 by way of a stabilizing circuit 4 for applying an electric voltage of 5 volts to the CPU 2 in continual manner. Subject to the voltage applications from both the stabilizing circuit 4 and the input interface circuit 6, the CPU 2 becomes ready for operation.

An operational switching group 7 includes a sliding switch 7a, a reclining switch 7b, a vertical switch 7c, and a lifter switch 7d. The sliding switch 7a is used to move a seat device ST forth and back along a pair of rails (not shown) fixed on a vehicle-body floor (not shown). The reclining switch 7b is used for reclining a seat-back SB back and forth relative to a seat-cushion SC to which the seat-back SB is hinged. The vertical switch 7c is used to move a front side of the seat-cushion SC on which an occupant sits in the vertical direction. The lifter switch 7d is used to move a rear side of the seat-cushion SC in the vertical direction. When the switches 7a, 7b, 7c, and 7d are turned on in one direction (in the other direction), motors 11a, 11b, 11c, and 11d are driven in one direction (in the other direction), respectively. It is to be noted that a position of a head-rest HD can be adjusted relative to the seat-back SB by employing a motor and a corresponding switch.

Theses switches 7a, 7b, 7c, and 7d are connected to the CPU 2 by way of the input interface circuit 6 and states (ON-in-one-direction, ON-in-the-other-direction, and OFF) of each motor are memorized in memory means in the CPU 2. Current positions of the seat-cushion SC relative to the rails, the seat-back relative to the seat-cushion SC, the front side of the seat cushion SC, and the rear side of the seat-cushion SC are also memorized in the memory means when a restoration switch 8a and a restoration switch 8b are turned on concurrently. If only the restoration switch 8a is turned on, even though the seat cushion SC per se, the seat-back SB, the front side of the seat cushion SC, or the rear side of the seat-cushion SC are moved after turning-on of the memorizing switch, the moved member or portion is returned automatically to the memorized position. The restoration switch 8b and the restoration switch 8a constitute a memory related switch group 8 and are connected to the CPU 2 by way of the input interface circuit 6.

Thus, the positions of the foregoing members can be adjusted in a suitable manner in light of an outer profile of an occupant who sits on the seat device ST.

At an output side of the CPU 2, a switching relay device 9 is provided for driving a slide motor 11a, a reclining motor 11b, a vertical-front motor 11c, and a lift motor 11d independently. Each motor is in the form of a bi-directional motor and is driven in either of one and the other directions by the well-known relay function of the switching relay device 9. The motors 11a–11d have the same motor drive control and when a specific motor is chosen to be driven, the corresponding coil (not indicated) of the switching relay device 9 is energized or activated.

For determining or measuring a current which flows through the motors 11a–11d, a motor pulse generating circuit 3 is provided. An output voltage of the switching relay device 9 is divided by a resistor R and the resultant current is fed as a motor current signal to a motor pulse generating circuit 3 which generates a ripple pulse signal whose number of pulses per unit time duration varies with the rotational number of each of the motors 11a–11d. Such a ripple pulse is fed to the CPU 2.

Figure 2:
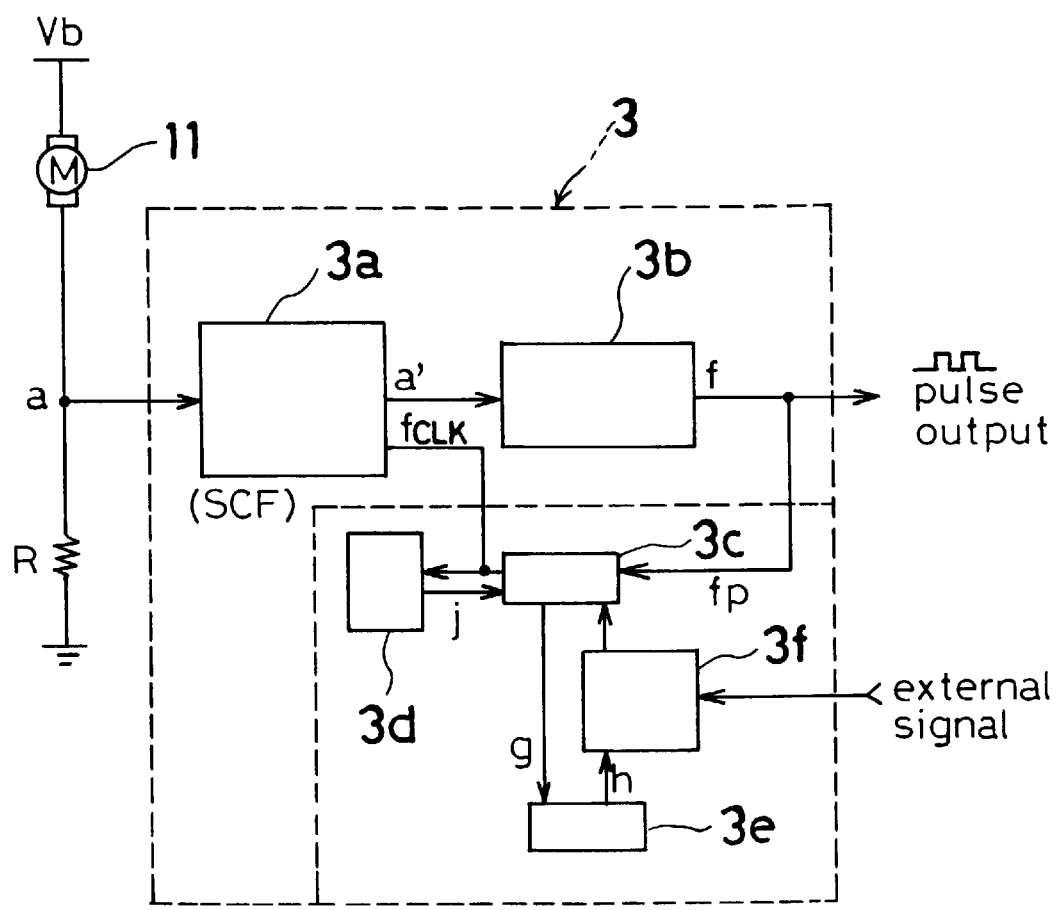
FIG. 2 is a block diagram of a motor pulse generating circuit of a device for determining a rotational number of a dc motor which is employed in the device shown in FIG. 1.

As illustrated in FIG. 2, the motor pulse generating circuit 3 includes a switched capacitance filter (hereinafter called simply SCF) 3a, a ripple pulse shaping circuit 3b, and a pulse generating circuit 3g. The pulse generating circuit 3g has a phase locked loop circuit (hereinafter called simply PLL) 3c, a frequency demultiplier 3d, a low pass filter (hereinafter simply called LPF) 3e, and an add-substrate circuit 3f.

Figure 3:
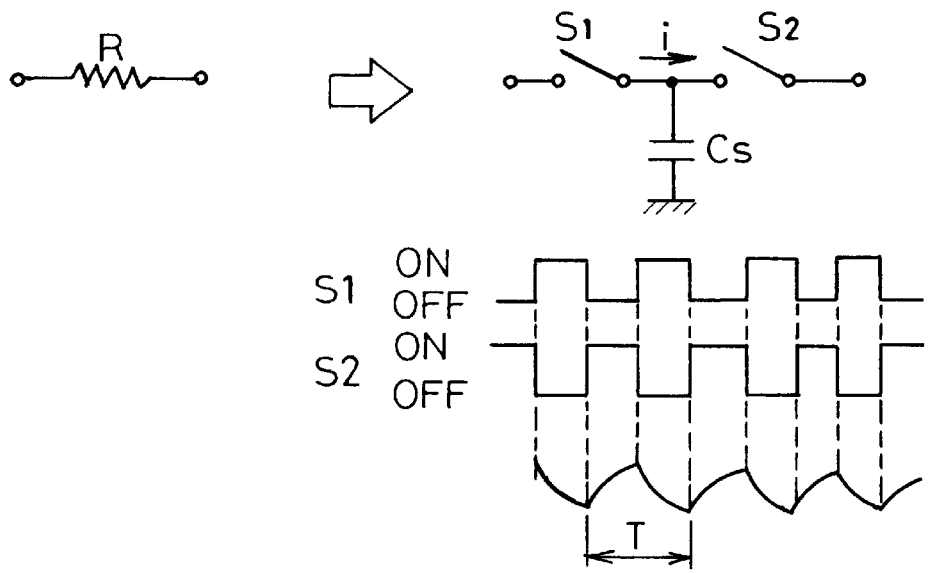
FIG. 3 is a view showing how to operate a switched capacitance filter of the motor pulse generating circuit shown in FIG. 2.
Figure 3:
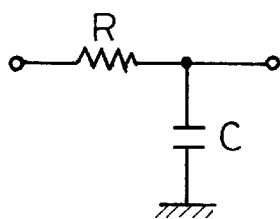

As can be understood easily from FIG. 3, the switched capacitance filter 3a is an application version of a well-known switched capacitance circuit which is constituted by a pair of analogue switches S1 and S2 and a capacitor Cs. If the switches S1 and S2 are turned on and off alternately at a cycle of T, an electric current i flows which is expressed in a formula of $i = V/(1/fC)$.

Thus, the switched capacitance can be regarded as an equivalent resister R. The cut-off frequency fc of a circuit which employees such a switched capacitance becomes variable which depends on the frequency for turning on and off the switches alternatively. In the case of a switched capacitance filter, instead of frequency, a clock input is available. Such a cut-off frequency fc can be expressed as the formula indicated in FIG. 3. The switched capacitance filter can be a commercially available IC supplied from National Semiconductor under the item symbol of MF6-50. This has a noise reduction function and provides a cutoff frequency of fc=fCLK/N where fCLK and N are a clock input frequency and a constant for example 50, respectively.

Figure 4:
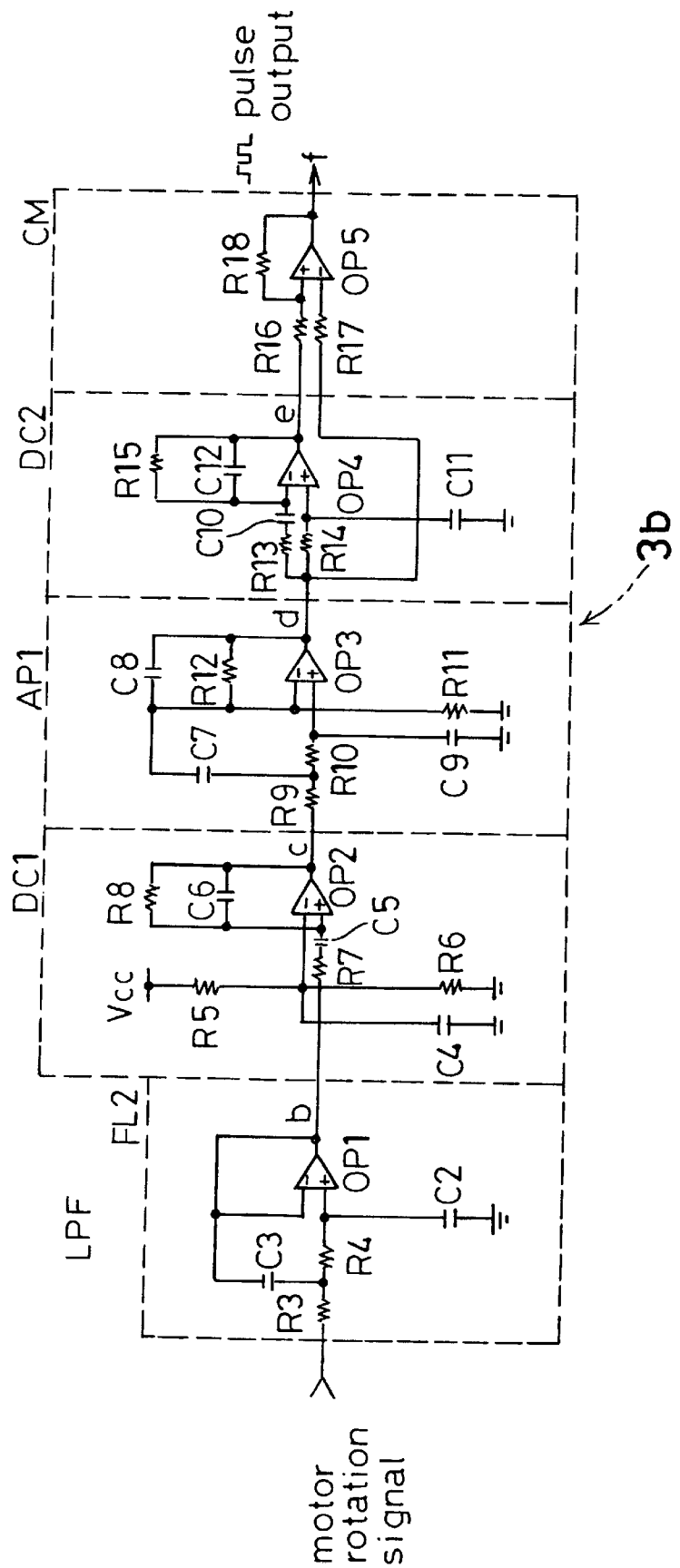
FIG. 4 is a detailed showing of the motor pulse generating circuit shown in FIG. 1.

The ripple pulse shaping circuit 3b, as can be seen from FIG. 4, includes a high frequency active filter FL2, a first differentiating circuit DC1, a second differentiating circuit DC2, an amplifier AP1, and a comparator CM.

In the high frequency active filter FL2, a series of resistors R3 and R4 are coupled to a non-inverting terminal of an operational amplifier OP1 which is also grounded to the earth by way of a capacitor C2. An inverting terminal of the operational amplifier OP1 is connected via a capacitor C3 to a point at which the resistors meet for feedback. The filter FL2 serves for eliminating a high frequency component of a motor rotational signal. In detail, for example, a noise component above the maximum rotational speed (for example 6000 rpm) can be eliminated by increasing its damping factor, whereby the filter FL2 acts as a low pass filter which deletes noise superposed on the motor rotational signal or ripple frequency.

The first differentiating circuit DC1 is connected to an output terminal of the filter FL2 and differentiates a signal outputted therefrom for damping or decaying the dc component thereof. A series connection of a resistor R7 and a coupling capacitor C5 is connected to an inverting terminal of an operational amplifier OP2. A voltage divided by a series of resistors R5 and R6 is applied to a non-inverting terminal of the operational amplifier OP2 and a point at which the resistors R5 and R6 connect is coupled with a bypass capacitor C4. A parallel connection of a resistor R8 and a capacitor C6 is connected between the non-inverting input terminal and an output terminal of the operational amplifier OP2.

An amplifier AP1, which serves for amplifying an output signal of the first differentiating circuit DC1, includes an operational amplifier OP3 whose non-inverting input terminal is connected to the output terminal of the operational amplifier OP2 via a series of resistors R9 and R10. The non-inverting input terminal of the operational amplifier OP3 is also grounded by way of a capacitor C9. A capacitor C7 is interposed between an inverting terminal of the operational amplifier OP3 and a point at which the resistors R9 and R10 are connected. The inverting terminal of the operational amplifier OP3 is grounded by way of a resistor R11. A capacitor C8 and a resistor R12 which are arranged in parallel are connected between the inverting input terminal and an output terminal of the operational amplifier OP3.

The second differentiating circuit DC2 is connected to the output terminal of the operational amplifier OP3 of the amplifier AP1 and differentiates a signal outputted therefrom for establishing a phase shift of 90 degrees. The second differentiating circuit DC2 includes an operational amplifier OP4 whose non-inverting input terminal is connected to the output terminal of the operational amplifier OP3 of the Amplifier AP1 via a resistor R14. The non-inverting input terminal of the operational amplifier OP4 is grounded by way of a capacitor C11. Between the output terminal of the operational amplifier OP3 and an inverting input terminal of the operational amplifier OP4, there are interposed a resistor R13 and a capacitor C10 which are arranged in series. A resistor R15 and a capacitor C12 which are arranged in parallel are connected between the inverting input terminal and an output terminal of the operational amplifier OP4.

The comparator CM, which compares output signals from the respective output terminal of the second differentiating circuit DC2 and output terminal of the amplifier circuit AP1, includes an operational amplifier OP5 whose inverting input terminal is connected via a resistor R17 to the output terminal of the operational amplifier OP3 of the amplifier circuit AP1. A non-inverting input terminal of the operational amplifier OP5 is connected via a resistor R16 to the output terminal of the operational amplifier OP4 of the second differentiating circuit DC2. A resistor R18 is connected between the non-inverting input terminal and the output terminal of the operational amplifier OP5. From the output terminal of the operational amplifier OP5, a rectangular pulse signal or a ripple pulse signal is outputted which corresponds to the ripple frequency and such a rectangular pulse signal is fed to the CPU 2 of the control device 1.

The current flowing through a motor 11 which means of any one of the motors 11a–11d can be appreciated as a voltage signal or motor rotational signal which is in proportion thereto in magnitude. This voltage signal is superposed with ripple together with noise and has a wave-shape (a) indicated in FIG. 4. The ripple is inevitable, as is well known, when a DC motor is employed.

During passing through the switched capacitance filter 3a, the noise is deleted or eliminated from the voltage signal and on the resultant voltage signal another noise is superposed due to the clock input to the switched capacitance filter 3a. However, passing such a voltage signal through the filter FL2 makes the voltage signal smooth without the noise and comes to have a wave-shape (b). If such a voltage signal having the wave-shape (b) is passed through the first differentiating circuit DC1, the voltage signal is differentiated to damp or decay its DC component and the resultant voltage signal to have a wave-shape (c). Furthermore, if passing the voltage signal through the amplifier AP1, the resultant or amplified voltage signal comes to have a wave-shape (d). Thereafter, after passing through the second differentiating circuit DC2, the voltage signal comes to have a wave-shape (e) which delays in a phase of 90 degrees with respect to the wave-shape (d). Then, comparing the voltage signal having the wave-shape (d) which is outputted from the amplifier AP1 and the voltage signal having the wave-shape (e) which is outputted from the second differentiating circuit DC2, the comparator CM issues the pulse signal having a wave-shape (f).

In the foregoing circuit feedback control of the pulse signal having the wave-shape (f) is established so as to make the frequency of the ripple pulse the cut-off frequency fc of the switched capacitance filter 3a. In detail, whenever the pulse signal having the wave-shape (f) is inputted or fed to the PLL 3c, the PLL 3c outputs a frequency of 50 fp which is derived from the formula of fc=FCLk/N where N=50. The output of the PLL 3c having a frequency of 60 fp divided by 60 at the frequency demultiplier 3d and the frequency demultiplier 3d fed the resultant frequency of fp to the PLL 3c. In brief, a phase control of the output signal of the frequency demultiplier 3d is made to oscillate at a frequency which is in coincidence with the frequency fp of ripple pulse inputted to the PLL 3c. Thus, the cut-off frequency fc of the switched capacitance filter 3a comes to have a linear relationship relative to the pulse output or ripple pulse.

In addition, for ensuring the stable output of the PLL 3c at an initial stage of the pulse generating circuit 3g, the PLL 3c is added with the LPF 3e and the add-subtract circuit 3f. The oscillation of the PLL 3c at the initial stage can be kept at a voltage level by applying a battery voltage Vb for driving the motor 11a (11b, 11c, 11d) to the add-subtract circuit 3f as an outside signal thereof. Immediately when the oscillation of the PLL 3c becomes its steady stage, the PLL 3c begins oscillate based on the ripple pulse signal inputted to the PLL 3c.

Figure 5:
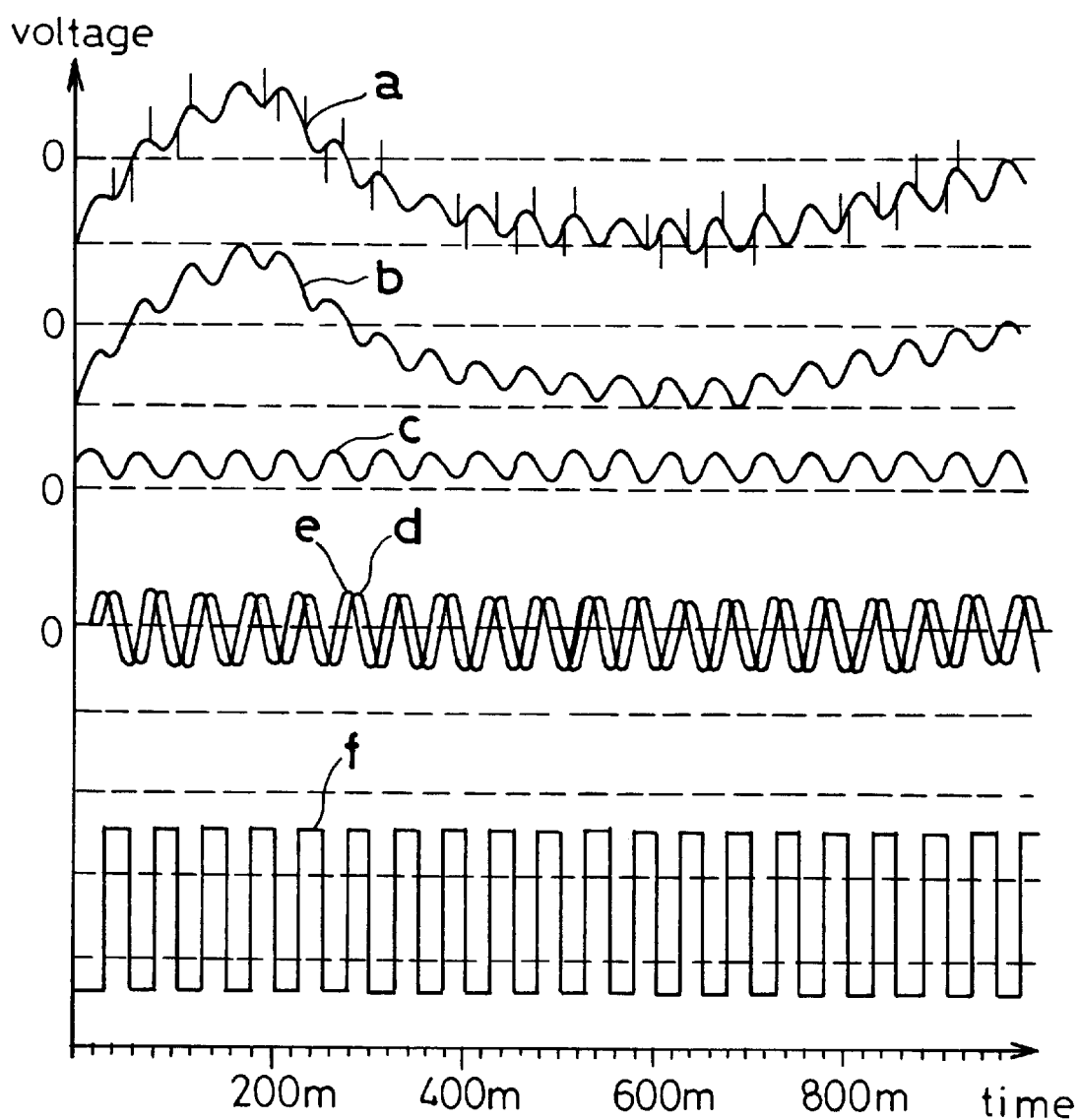
FIG. 5 shows graphs, each of which is indicative of a waveform at various points in the motor pulse generating circuit shown in FIG. 1.

In FIG. 5, if output signal wave-shapes of the frequency demultiplier 3d, the PLL 3c, and LPF 3e are assumed to be (j), (g), and (h), respectively, those wave-shapes are depicted in more detail in FIG. 5.

Figure 6:
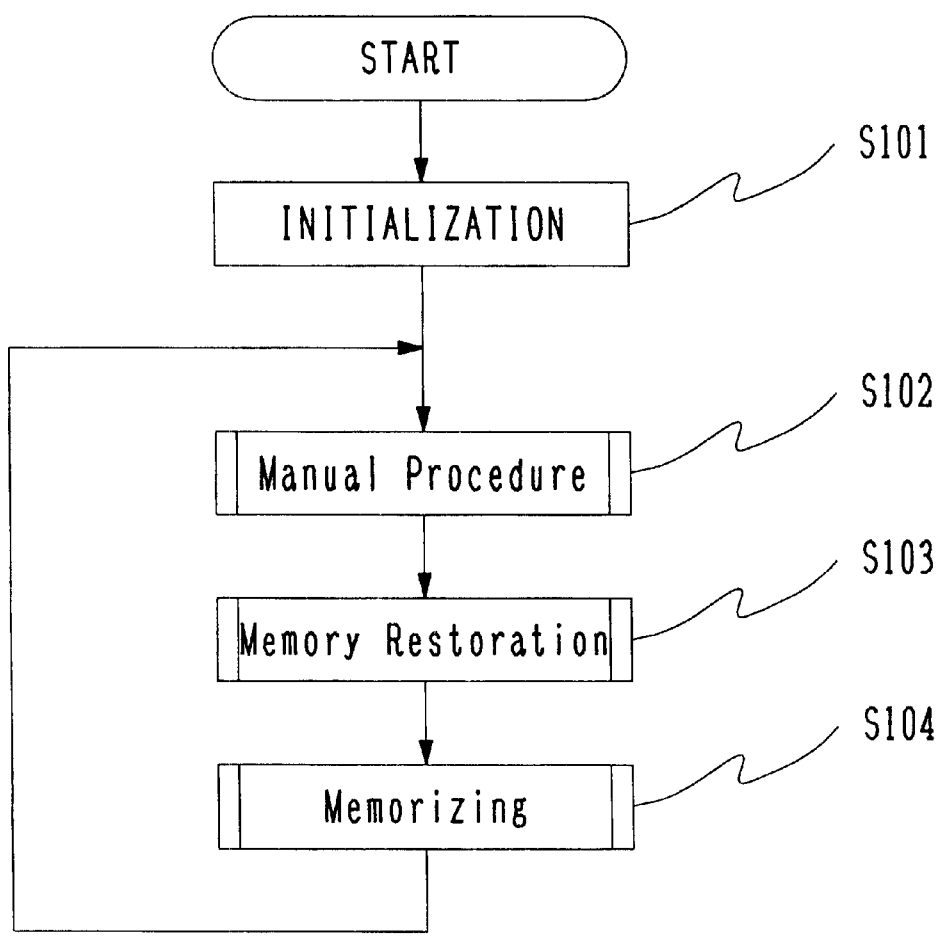
FIG. 6 is a flowchart providing control of the device shown in FIG. 1.

With reference to FIG. 6, an operation of the memory seat device illustrated in FIG. 1 is explained. After insertion of a key (not shown) into a key cylinder (not shown), the key is rotated through a fixed angle in the usual manner, the ignition switch 13 is turned on, thereby applying electric power to the control unit i from the battery 12. Then, a main program stored in the CPU 2 in the control unit 1 is executed every 2 milliseconds according to a flowchart shown in FIG. 6.

In the main program, first of all, at step S101 an initialization is made to check ROMs and RAMs, set memories or counters to zeros or other starting values, and check whether or not the system operates normally. Thereafter, at step S102, a manual procedure is executed.

Figure 7:
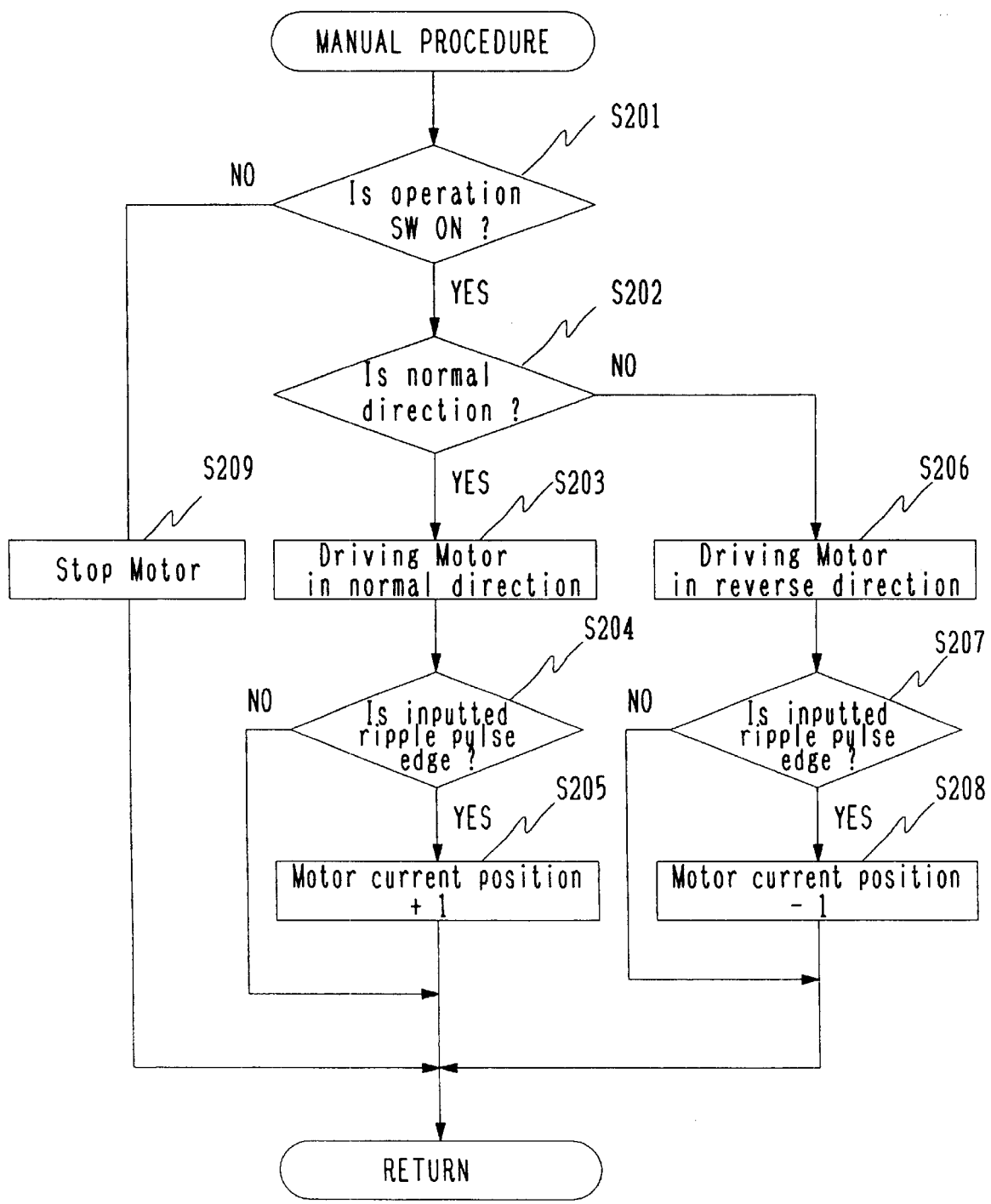
FIG. 7 is a subroutine flowchart of the manual procedure shown in FIG. 6.

In the manual procedure as shown in FIG. 7, first of all, at step S201, it is checked whether or not a switch 7 or any one of the operation switches 7a–7d is closed by the occupant. The motor control is common in the motors 11a–11d by which specific motor operations of the respective motors 11a–11d are not made.

If the result of step S201 indicates that the operation switch 7 is not closed and it fails to request any movements of the memory seat, the motor 11 is stopped at step S209 and this manual procedure per se is terminated. If the result of step S201 indicates the closed condition of the operation switch 7, step S202 is executed to check, depending the closed condition of the operation switch, whether the motor 11 is requested to drive in the normal direction or reverse direction. Such normal and reverse directions are associated, at the vehicle design stage, with each of the movements of the seat device in the vehicle-longitudinal direction, the seat-back reclining direction, and the seat-cushion vertical movements. In case of a request for the normal direction, at step S203, the CPU 2 activates the switching relay 9 to drive the motor 11 in the normal direction.

At next step or step S204, a check is made whether or not an edge of the ripple pulse is fed to the CPU 2 from the motor pulse generating circuit 3. If not, the manual procedure is terminated. If the result is true, at step S205, a motor position counter which stores the current position of the motor 11 is added with '1'. The resultant value is then stored in the motor position counter which indicates the new current position of the motor 11.

On the other hand, if the result of step S202 indicates the reverse direction for driving motor 11, at step 206, the CPU 2 activates the switching relay 9 to drive the motor 11 in the reverse direction.

At next step or step S207, a check is made whether or not an edge of the ripple pulse is fed to the CPU 2 from the motor pulse generating circuit 3. If not, the manual procedure is terminated. If the result is yes, at step S208, the motor position counter which stores the current position of the motor 11 is subtracted with '1'. The resultant value is then stored in the motor position counter which indicates the new current position of the motor 11.

Figure 8:
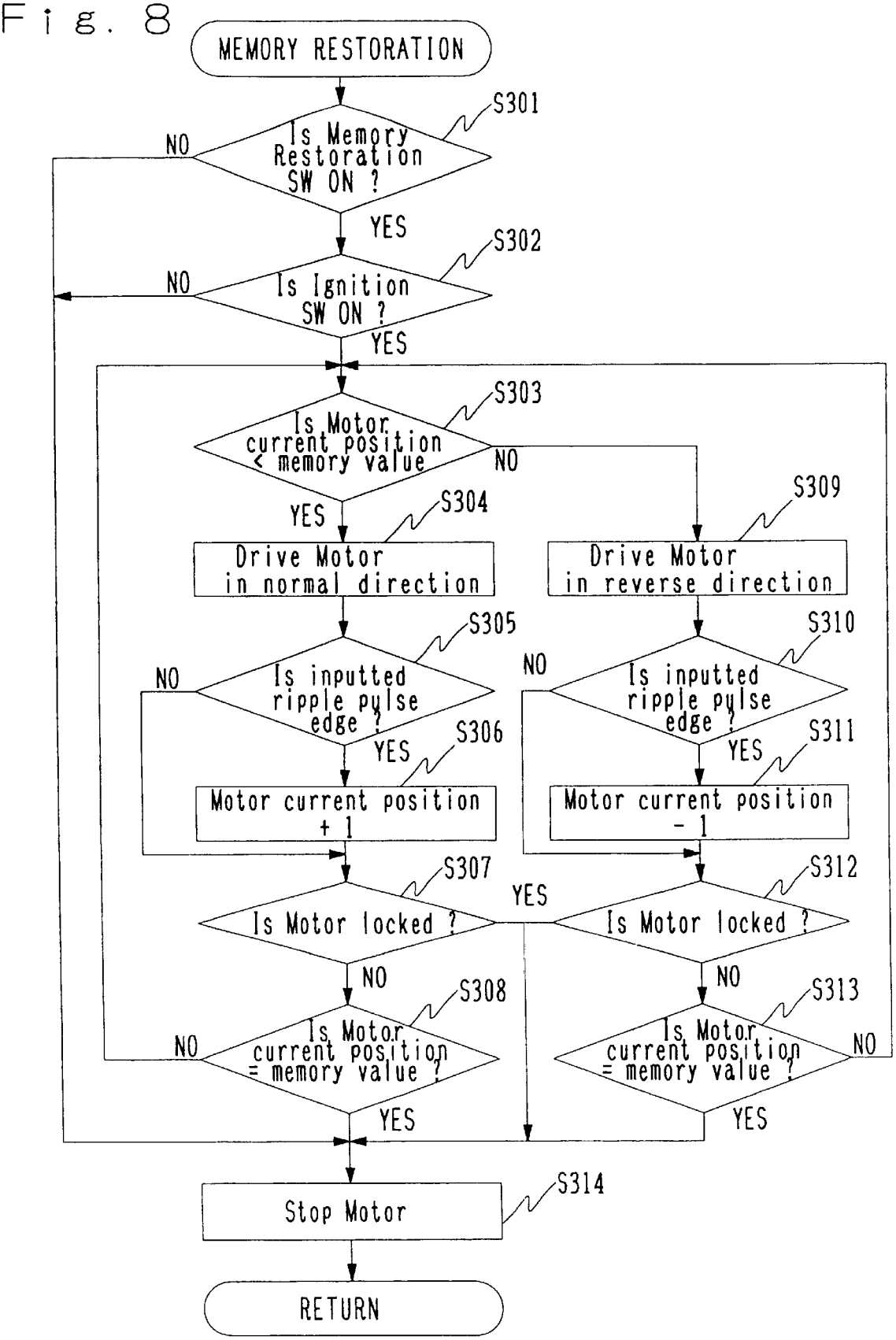
FIG. 8 is a subroutine flowchart of the restoration procedure shown in FIG. 6.

With reference to FIG. 8 which provides control of the memory restoration procedure, at step S301, it is checked whether the memory restoration switch 8a is turned on or not. If the result is no, the control jumps to step S314. If the result of step S301 is yes, the CPU 2 recognizes a necessity for an automatically easy adjustment of the memory seat and then executes step S302. At step S302, the ignition switch 13 is examined to see if it is on. If the result is yes, step 304 is executed. If no, at step S303, current motor position comparison is made in such a manner that the current motor position stored in the current position memory as mentioned above is compared with a value in a fixed memory which represents the occupants own favorite position in digital code. If the current motor position is less than (equal to or larger than) the fixed value, the motor is driven in the normal direction at step S304 (in the reverse direction at step S309).

After the execution of step S304, steps S305–S308 are executed which are similar to steps S310–S313 which are executed after execution of step S309. In steps S305–S308 (steps S309–S5313), in case of the edge input of the ripple pulse, the motor position counter is brought into increment (decrement) when the motor is driven in the normal (reverse) direction, thereby updating the value in the motor position counter. Thereafter, if no pulse input is found within a time period of 0.5 seconds, for example, a motor-lock is checked. If the pulse is found within the foregoing time-period, the current motor position is compared to the fixed value. If the result is false, the current position of the memory seat is understood not to return to its initial or originally fixed position and the control is returned to step S303. Thereafter, the steps subsequent to step S303 are executed in repeated manner and if the current motor position becomes the initial position, step S314 is executed for terminating the motor 11.

Figure 9:
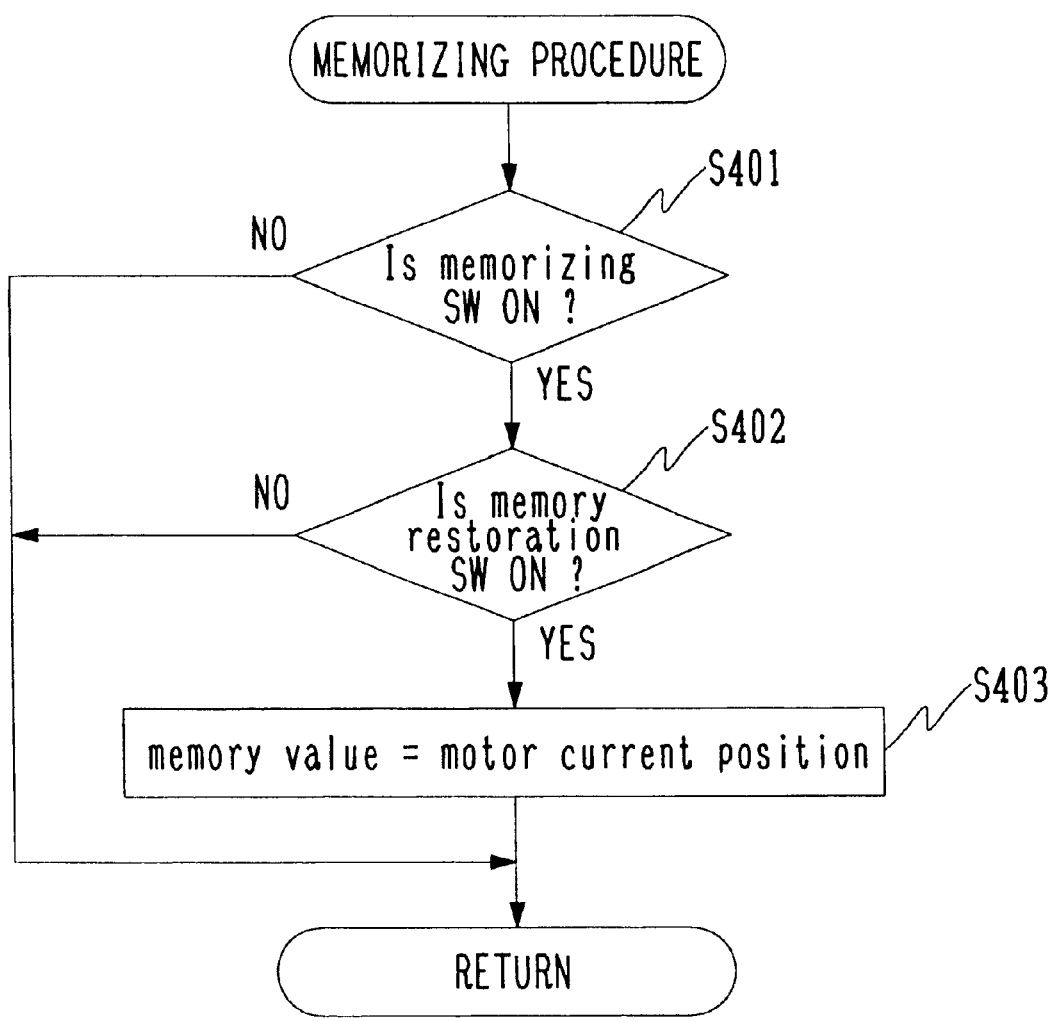
FIG. 9 is a subroutine flowchart of the memorizing procedure shown in FIG. 6.

Thereafter, step S104 in the main routine is performed. In detail, referring to FIG. 9 which provides a control of memorizing procedure, at step S401, it is determined whether the memorizing switch 8b is pressed or not. If so, it is understood that a memory request is made and step S402 is executed to check whether or not the restoration switch 8a is pressed. Only when both the memorizing switch 8b and the restoration switch 8a are pressed in concurrency or simultaneously, step S403 is executed for storing the current position of the element of the memory seat as it is into the fixed memory.

Of course, instead of the memory seat, other movable members can be driven under the control of the foregoing controller 1 or a modified version thereof.

In the foregoing control device, a motor pulse generating circuit is provided. The motor pulse generating circuit generates the cut-off frequency which is variable depending on the ripple pulse frequency which is indicative of the rotational number of the motor, which requires no other means for determining the rotational number of the motor. The motor pulse generating circuit can be integrated with the controller. Particularly, the motor pulse generating circuit and the controller can be configured on a common substrate, which results in easier assembly. In addition, only the motor pulse generating circuit can treat plural motors which are to be driven individually, thereby lowering the production cost.

In addition, since the motor pulse generating circuit includes the switched capacitance filter for eliminating noise from the motor, the cut-off frequency of the switched capacitance filter being dependent on a clock input thereof, the pulse shaping circuit for generating a ripple pulse signal indicative of the rotational number of the motor by wave-shaping the output of the switched capacitance filter, and the pulse generating circuit providing pulses to the clock input of the switched capacitance filter, the pulses controlling the cut-off frequency on the basis the ripple pulse frequency, the means for determining the rotational number of the motor can be in the form of circuitry in a simple manner. The cut-off frequency varies in linear mode when the pulse is applied to the clock-input of the switched capacitance filter for controlling the cut-off frequency based on the ripple pulse, which causes a linear mode follow of the cut-off frequency with the frequency variation of the ripple pulse, thereby enabling an increase of decrement rate of the filter which becomes larger depending on the noise. Thus, the correct ripple pulse can be generated depending on the motor rotational number which varies in wide range, thereby coping with motors having much noise.

Figure 10:
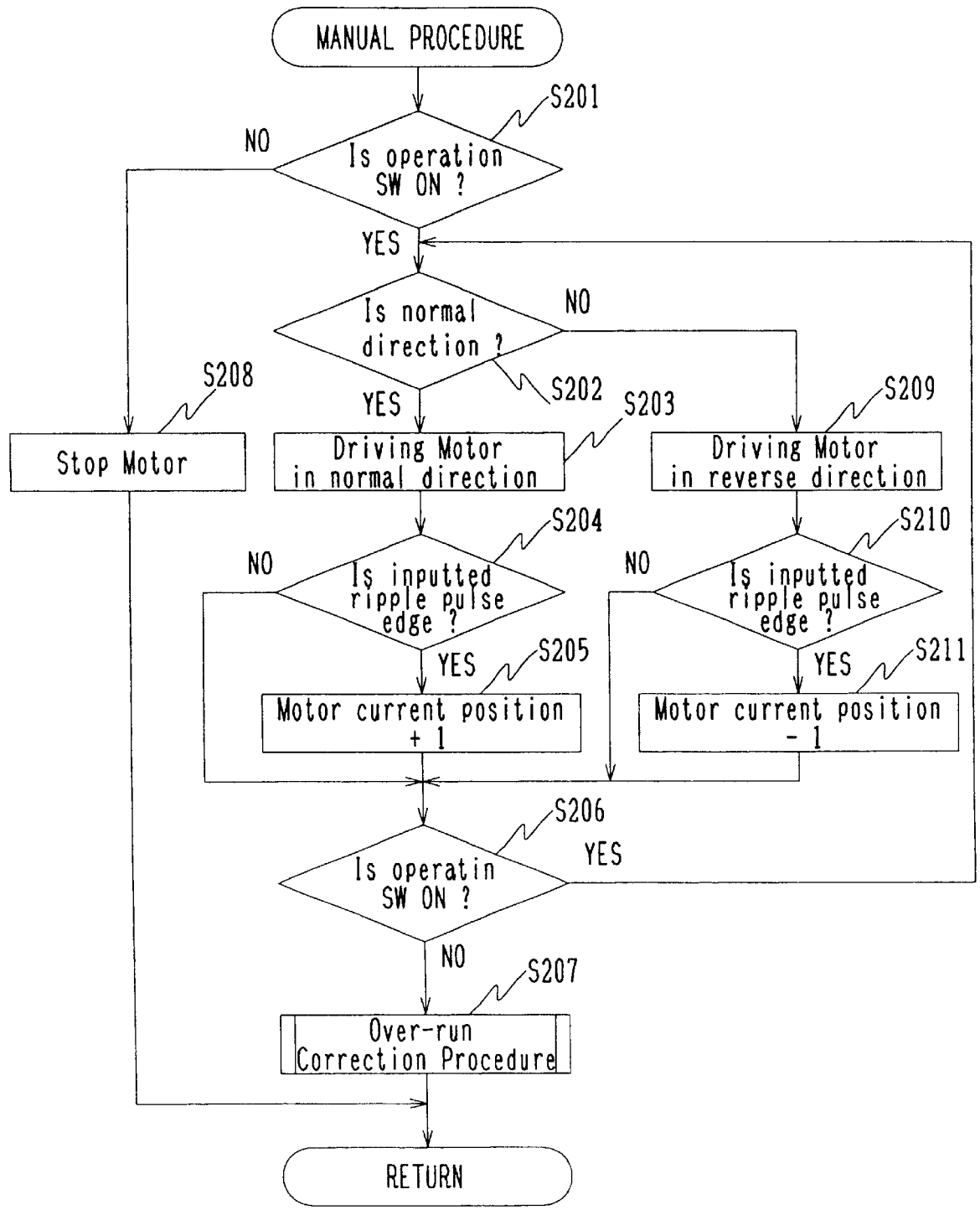
FIG. 10 is a subroutine flowchart of the manual procedure shown in FIG. 6 as an improved version of the subroutine shown in FIG. 7.

Referring next to FIG. 10, there is depicted a flowchart which is in the form of amending the flowchart in FIG. 7. That is to say, in addition to the contents in FIG. 7, the flowchart in FIG. 10 has additional steps S210 and S211, which are only detailed hereinafter.

At step S210, it is checked whether or not the switch 7 is turned on. If the result is yes, the control is returned to step S202 and if the result is no, step S211 is executed.

Figure 11:
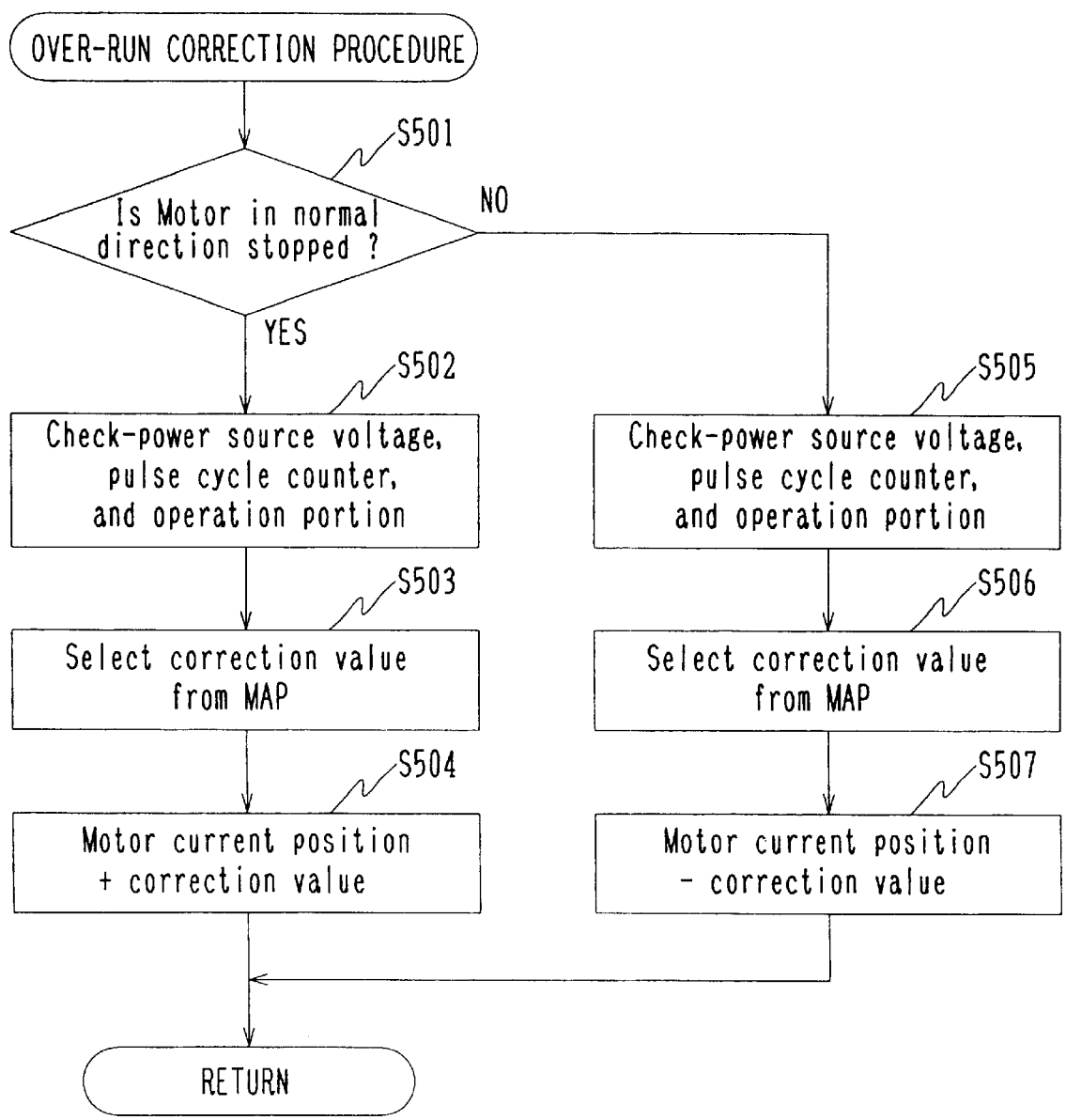
FIG. 11 is a subroutine flowchart of the over-run correction procedure.

Step S211 is a subroutine for over-run correction and its detailed contents are depicted in FIG. 11. The reason why such a subroutine is required is as follows: Even though no current is supplied to the motor 11 upon its termination, the motor 11 tries to operate due to inertia, which means in spite of no ripple pulse generation the member such as the seat ST, seat-cushion SC, seat-back SB or head-rest HD associated to the motor 11 moves. Thus the calculated position based on the number of the ripple pulses of the member becomes different from its actual position, thereby requiring a correction on such a deviation.

Referring to FIG. 11 for explaining the over-run routine in detail, at step S501 it is checked whether or not the stopped motor 11 was in normal direction or reverse direction. This can be done by checking the signal for driving the relay 9. If the result is indicative of the normal direction (the reverse direction), steps S502, S503, and S504 (S505, S506, and S507) are executed in turn.

Figure 12:
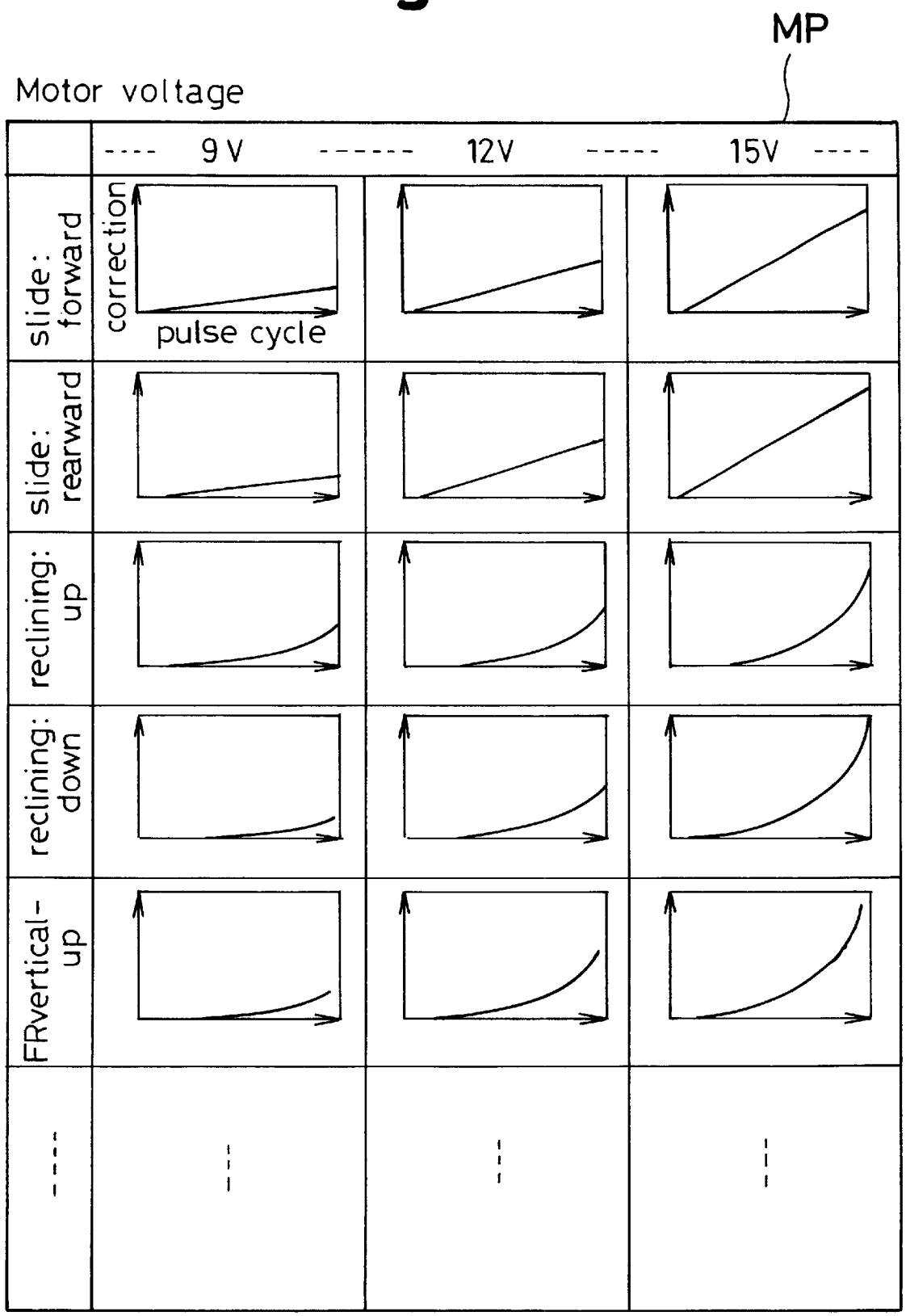
FIG. 12 is a conception structure of over-run correction MAP.

The CPU 2 orders the controller 1 to watch continually the power source voltage supplied to the controller 1 and the motor 11. The CPU 2 watches the period of the ripple pulse inputted as the motor speed from the motor rotational pulse generation circuit 3 which is made by using a pulse period counter (not shown) and detects which motor is in operation of the slide motor 11a, the reclining motor 11b and others. Then, recognizing three factors: the motor voltage, the pulse period, and the moved portion, the CPU 2 selects a suitable correction number from the correction number map shown in FIG. 12 and the resultant correction number is added to the current position number based on the number of ripple pulses. Each correction number in the MAP in FIG. 12 is calculated by experiments wherein how many times the shaft of the motor 11 rotates after termination thereof is measured in plural times on the basis of the motor speeds. The MAP per se is stored or held in the CPU 2.

In detail, the correction numbers vary depending on the voltage for driving the motor 11. In light of the fact that when the motor 11 under operation is stopped the voltage for driving the motor 11 is in proportion to the motor rotational number, the correction number is set to be larger (smaller) as the motor speed is larger (smaller). In this case, motor operation conditions are considered. That is to say, motor characteristics, operational direction, pulse period and so on are taken into consideration. For, example, in the case where the seat ST is moved along a pair of vehicle-body-lengthwise extended rails, a slant inclination is made on each rail in such manner that a front end of the rail is set to be slightly higher than a rear portion thereof. Thus, the motor rotational number becomes smaller for the frontward movement of the seat ST than for rearward movement thereof, with the result that the correction number is set to be slightly smaller in the case of the former than in the case of the latter. In addition, in the reclining of the seat-back and the movement of the headrest, the correction number for movement against gravity is set to be smaller. The correction number in the MAP is set to be changed as an increasing function of the first order or the second order, which makes precise estimating of the member movement in consideration of the actual inertia, there by enabling a precise calculation of the over-run movement of the member.

Figure 13:
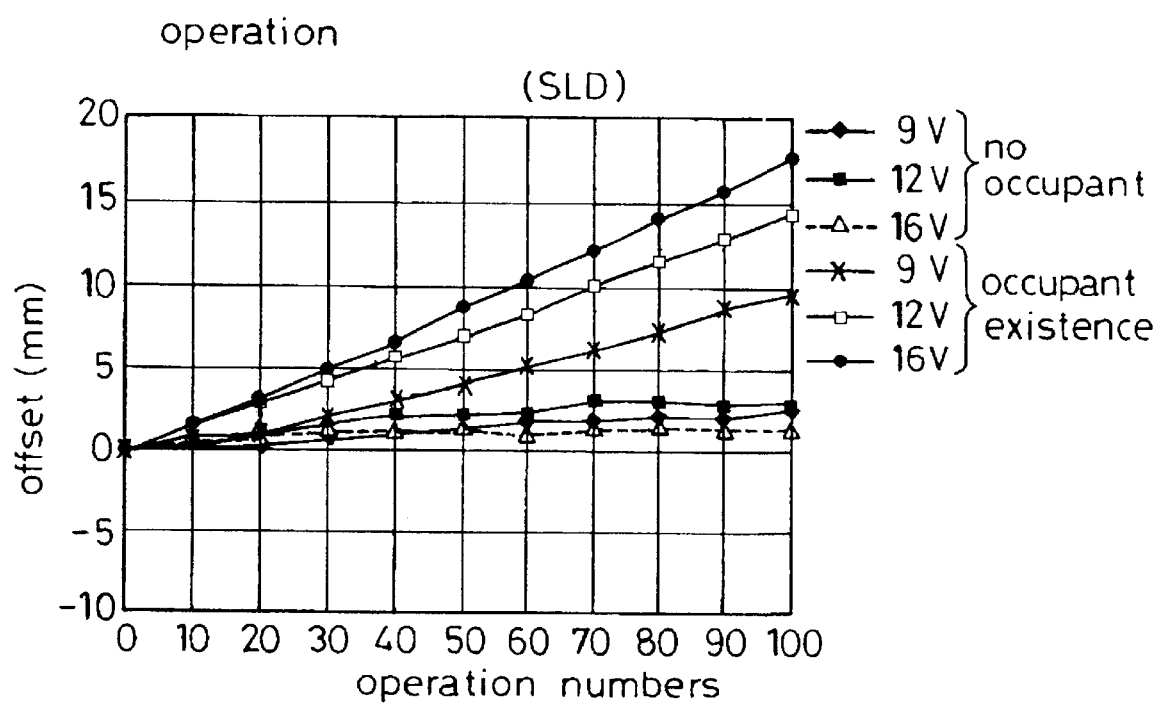
FIGS. 13a and 13b show comparison graphs for proving the effects of over-run correction.
Figure 13:
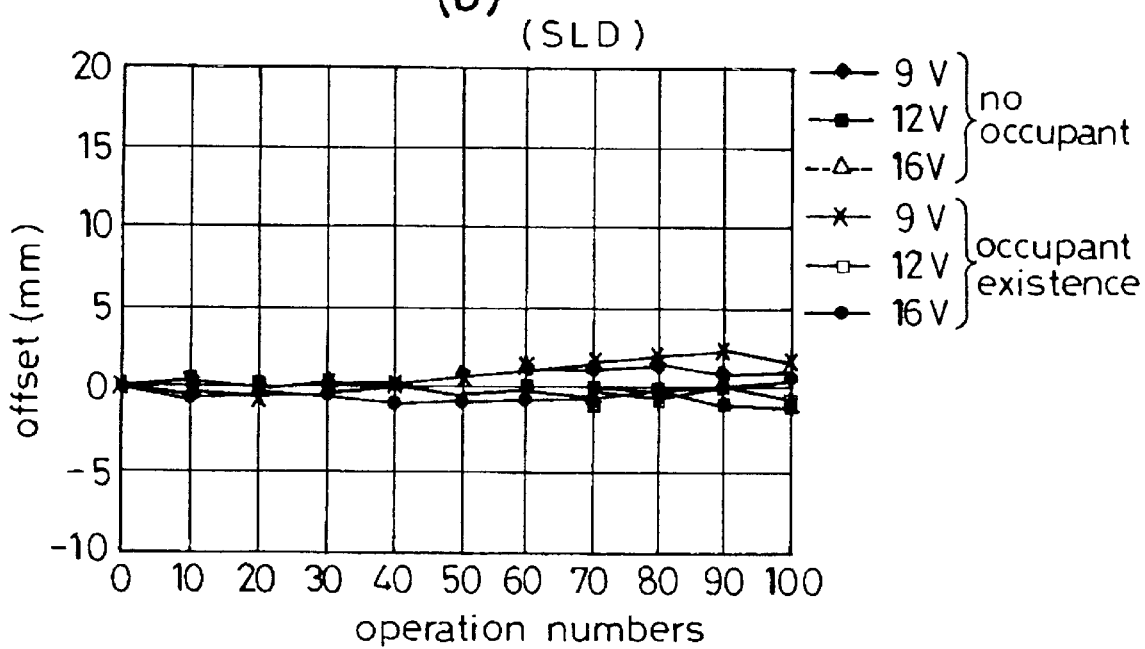

Conventionally, during a time duration required for perfect termination of the motor 11 after ordering the motor 11 to stop, a deviation or an error occurs between the designed seat position based on the ripple pulses and the actual seat position and such an error is added with a new one whenever the movement is made. Though the resultant error accumulation causes unexpected deviations as shown in FIG. 13(a), the foregoing correction makes the deviations as small as possible as shown in FIG. 13(b), thereby increasing the device reliability.

In accordance with a second embodiment of the present invention, the motor pulse generating circuit generates the cut-off frequency which is variable depending on the ripple pulse frequency which is indicative of the rotational number of the motor, which requires no other means for determining the rotational number of the motor. The movable member is driven by the motor which is in association with the motor pulse generating circuit, with the result that the current position of the movable member can be determined precisely by using correction numbers held in the CPU even though the movable member fails to stop at a designed position when the motor is made to be terminated due to its inertia.

If the position of the movable member is defined as its initial position when a voltage is applied to the controller, the displacement or moving amount of the movable member can be calculated with ease.

Making the correction MAP in consideration of motor rotation conditions such as power source voltage, operational direction, pulse cycle, and other motor characteristics establishes more precise determination of the current position of the movable member when the motor is in a perfect stopped state.

In addition to the foregoing motor rotation conditions, making the correction MAP dependent on each power supply voltage brings more precise determination of the current position of the movable member when the motor is in perfect stopped state.

The invention has thus been shown and described with reference to specific embodiments, however, it should be understood that the invention is in no way limited to the details of the illustrated structures but changes and modifications may be made without departing from the scope of the appended claims.

What is claimed is:

1. A control device for a movable member comprising:
   a DC motor for moving the movable member;
   a pulse shaping circuit for shaping a ripple pulse indicative of a rotational number of the DC motor;
   a clock generating circuit providing a clock signal according to the ripple pulse;
   a filter for eliminating noise in a current wave or a voltage wave of the DC motor depending on a cut-off frequency which is varied by the clock signal;
   wherein the pulse shaping circuit shapes the ripple pulse according to the current wave or the voltage wave of the DC motor;
   position calculation means for calculating a present position of the movable member according to the ripple pulse;
   memory means for storing a desired position as a first position; and
   control means for controlling a drive of the DC motor to move the movable member from other than the first position to the first position.

2. A control device as set forth in claim 1, further comprising:
   correction means for correcting the present position according to a correction number as a predetermine distance of the movable member which moves by an inertia action of the DC motor when the drive of the DC motor is stopped.

3. A control device as set forth in claim 2, wherein the correction number is set based on rotational conditions of the DC motor.

4. A control device as set forth in claim 2, wherein the correction number is set based on a power source voltage applied to the DC motor.

5. A control device for a movable member comprising:
   a DC motor for moving the movable member;
   a pulse shaping circuit for shaping a ripple pulse indicative of the rotational number of the DC motor according to a current wave or a voltage wave of the DC motor;
   position calculation means for calculating a present position of the movable member according to the ripple pulse;
   memory means for storing a desired position as a first position;

control means for controlling a drive of the DC motor to move the movable member from other than the first position to the first position; and correction means for correcting the present position according to a correction number as a predetermine distance of the movable member which moves by an inertia action of the DC motor when the drive of the DC motor is stopped.

6. A control device as set forth in claim 5, wherein the correction number is set based on rotational conditions of the DC motor.

7. A control device as set forth in claim 5, wherein the correction number is set based on a power source voltage applied to the DC motor.

* * * * *

UNITED STATES PATENT AND TRADEMARK OFFICE
CERTIFICATE OF CORRECTION

PATENT NO.    : 6,320,341 B1
DATED         : November 20, 2001
INVENTOR(S)   : Toshimitsu Oka, Kohji Aoki, Hideyuki Kanie and Hitoshi Ishikawa It is certified that error appears in the above-identified patent and that said Letters Patent is hereby corrected as shown below:

<u>Title page,</u>
Item [30], insert:

-- [30]    Foreign Application Priority Data

Oct. 29, 1998   (JP)................................10-308391
Feb. 25, 1999   (JP)...............................11-048271 --

Signed and Sealed this

Twenty-seventh Day of August, 2002

Attest:

Attesting Officer

JAMES E. ROGAN
*Director of the United States Patent and Trademark Office*